Dec. 27, 1955  P. C. BRINER  2,728,889
ELECTRICAL LEAKAGE TESTER
Filed Oct. 3, 1952

INVENTOR.
PAUL C. BRINER
BY Rudolph L. Lowell
ATTORNEY.

United States Patent Office 2,728,889
Patented Dec. 27, 1955

2,728,889

ELECTRICAL LEAKAGE TESTER

Paul C. Briner, Waterloo, Iowa, assignor to Nelson Tester Company, Incorporated, Waterloo, Iowa, a corporation of Iowa Application October 3, 1952, Serial No. 312,967

4 Claims. (Cl. 324—54)

This invention relates generally to leakage testing apparatus for electrical systems and more particularly to apparatus for testing the quality of electrical insulation about a conductor.

An object of this invention is to provide an improved apparatus for testing the quality of electrical insulation.

A further object of this invention is to provide a testing apparatus which indicates by a test light any electrical leakage in the insulation for a conductor under conditions where visual observation of the insulation to observe the leakage is impossible.

Another object of this invention is to provide a testing apparatus having a high frequency transformer unit in circuit with a test lamp and an electrode or prod for detecting a defect in the insulation for a conductor carried in a grounded metal conduit or clamp, so that when a circuit is completed through the prod to ground, the voltage reflected back from the secondary to the primary of the transformer is utilized to light the test lamp.

A still further object of this invention is to provide a leakage testing apparatus which is of a rugged and simple construction, economical to manufacture and efficient in operation over a prolonged service life while requiring a minimum of servicing and repair.

Figure 1:
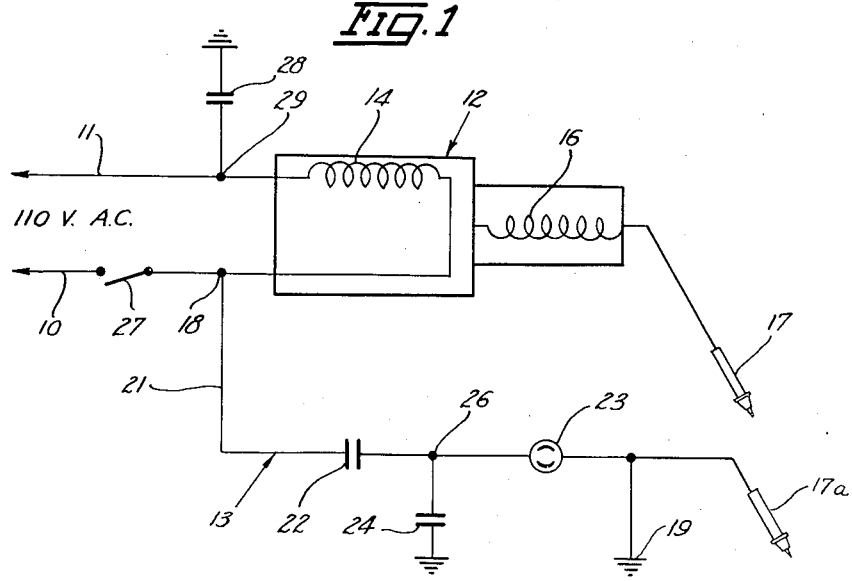
Figure 2:
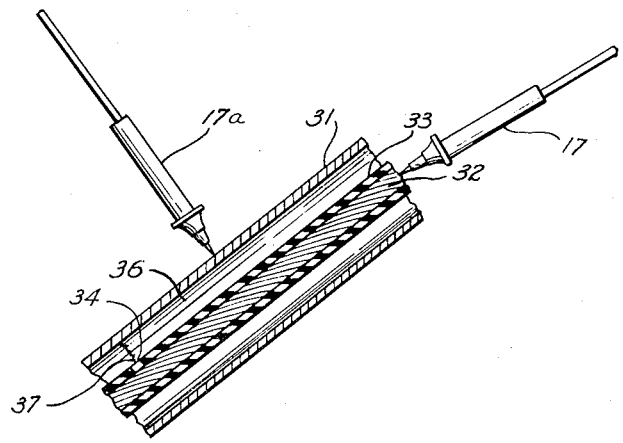

Further objects, features and advantages of this invention will become apparent from the following description when taken in connection with the accompanying drawing in which:

Fig. 1 is a diagrammatic electrical circuit of the testing apparatus of this invention; and Fig. 2 is a diagrammatic view illustrating how the testing apparatus of Fig. 1 is used.

With reference to the drawing, the testing apparatus shown in Fig. 1 includes a pair of leads 10 and 11 connected to a usual 110 volt A. C. supply (not shown), and a high frequency step-up transformer 12 having a primary 14 connected across the leads 10 and 11, and a secondary 16 provided with a discharge electrode or test prod 17. The high frequency unit 12 is of a commercially available type used in ultra-violet ray machines and operates with a frequency of about 2000 kilocycles at about 30,000 volts.

A branch circuit 13 includes a conductor 21 connected at one end to the lead 10, as at 18, at a position between the primary 14 and the 110 volt supply. The other end of the conductor 21 is connected to ground as at 19. A condenser 22 and a test lamp 23 are connected in series in the line 21. Connected to the conductor 21 at 26 intermediate the condenser 22 and test lamp 23 is a grounded condenser 24. A ground prod or electrode 17a is connected to the conductor 21 at a position between the test lamp 23 and the ground 19.

A control switch 27 is interposed in the lead 10 ahead of the connection 18, and a grounded condenser 28 is connected to the line 11, as at 29, ahead of the transformer unit 12.

In the operation of the testing apparatus of Fig. 1, the discharge electrode 17, which functions as a test prod, is placed in contact with a conductor 32 (Fig. 2) having insulation 33 and carried within a usual metal conduit or clamp 31. The ground electrode or test prod 17a is placed in contact with the conduit 31. Where defective insulation occurs a spark 37 takes place between the conductor 32 and the conduit 31, whereby the test lamp 23 is energized.

The condenser 22 has sufficient capacitance to prevent a supply of power to the lamp 23 from the 110 volt A. C. supply capable of energizing the lamp 23. Thus, when the switch 27 is closed a normal corona discharge from the electrode 17 may effect a reflected voltage in the primary 14 which causes a current flow through the condenser 22 with such current being insufficient to light the lamp 23. However, this current may be enough to cause a flickering glow of the lamp 23. To prevent such flickering there is provided the condenser 24 which by-passes the lamp 23 to reduce the sensitivity thereof.

Let it be assumed that the insulation 33 has a break or zone of poor insulation as indicated at 34 (Fig. 2). When the test prod 17a is placed on the metal conduit 31 the current flowing into the conductor 32 from the test prod 17 jumps the gap 36 between the conduit 31 and the conductor 32 at the break 34, and to the test prod 17a to complete the circuit. When the circuit is completed a free current flow takes place through the circuit including the lamp 23, and with this current flow being greater than that effected previously by the normal corona discharge. An increased voltage is thus reflected back from the secondary 16 to the primary 14 of the transformer unit 12. The flow of this increased reflected voltage through the condenser 22 provides for a positive lighting of the test lamp 23 to indicate to the operator that the insulation 33 is defective at some place within the casing 31.

In one embodiment of the invention, the lamp 23 is of a size to light up at a voltage of about 90 volts and each of the condensers 22, 24 and 28 has a capacitance of about .01 microfarad. The voltage reflected from the secondary 16 to the primary 14 is about 65 volts when there are no breaks in the insulation 33 and only the corona discharge from the electrode 17. This reflected voltage of approximately 65 volts feeding through the condenser 22 might cause the lamp 23 to flicker. However, by connecting the condenser 24 in parallel with the lamp 23, the sensitivity of the lamp is reduced so that the lamp lights only when a voltage greater than 65 volts, and in the neighborhood of 90 volts, exists in the circuit.

When there is a break in the insulation 33 and the gap 36 is $\frac{1}{16}$ of an inch, the reflected voltage is about 300 volts which causes the lamp 23 to light. The reflected voltage will vary as the gap 36 is increased, but so long as the reflected voltage is greater than about 90 volts the lamp 23 will be energized. In other words so long as the voltage required to light the lamp 23 occurs between minimum and maximum gaps over which the test apparatus is designed to operate, the lamp 23 will always be energized when a defect in the insulation 33 is present.

It is seen, therefore, that the testing apparatus of this invention provides a simple and efficient method for indicating by a test lamp, leakage in a hidden system where a visual observance of defective insulation is not possible. It is to be noted also that the testing apparatus is operated by merely closing the switch 27 and positioning the test prod 17a on the metal casing 31 for an insulated conductor 32, and the test prod 17 on the conductor 32.

Although the invention has been described with respect to a preferred embodiment thereof it is to be understood that it is not to be so limited since changes can be made therein which are within the full intended scope of this invention as defined by the appended claims.

I claim:

1. Apparatus for testing the quality of electrical insulation about a conductor comprising a source of alternating current supply, a step-up transformer having a primary and a secondary, with said secondary having a discharge electrode and said primary being connected to said source of current supply, a circuit including a test light, a condenser and a test prod connected in series, said circuit being connected to said source of supply ahead of said transformer and to ground between said test lamp and said test prod and a grounded condenser connected in the primary circuit of said transformer on the opposite side of said source of supply from said circuit.

2. Apparatus for testing the quality of electrical insulation about a conductor comprising a source of alternating current supply, a pair of leads connected to said source of supply, a high frequency transformer unit having a primary and a secondary with the primary being connected across said pair of leads and the secondary having a single discharge electrode, a circuit including a test light, a condenser and a test prod connected in series, with said circuit being connected to one of said leads ahead of said transformer and to ground at said prod.

3. Apparatus for testing the leakage in electrical systems comprising a source of alternating current supply, a pair of leads connected to said source of supply, a high frequency transformer unit having a primary and a secondary with the primary being connected across said pair of leads and the secondary having a discharge electrode, a circuit connected to and extended between one of said leads and ground, said circuit including a first condenser and a test lamp and a test prod connected in series, a second grounded condenser connected in said circuit between said first condenser and said test lamp, and a third grounded condenser connected to said other lead between said source of supply and said transformer.

4. Apparatus for detecting defective zones in the insulation for an electrical conductor carried within a metal conduit, said apparatus comprising a source of voltage supply, a high frequency transformer having a primary connected across said source of voltage supply and a secondary provided with a discharge electrode, a grounded condenser and a test prod and a test lamp connected in series to said source of supply ahead of said transformer, with the capacitance of said condenser acting to reduce the sensitivity of said lamp to provide for the continuous lighting of said lamp when a defect is present in said insulation, whereby when said test prod is positioned on said metal conduit and said electrode is positioned in contact with said conductor, a circuit is completed between said electrode and said test prod by the occurrence of a spark between said metal conduit and said conductor, at a defective zone in said insulation, to thereby light said test lamp.

References Cited in the file of this patent
UNITED STATES PATENTS

| | | |
|---|---|---|
| 1,919,802 | Pfeiffer | July 25, 1933 |
| 2,091,813 | Hays | Aug. 31, 1937 |
| 2,280,119 | Gorman | Apr. 21, 1942 |
| 2,422,288 | Boynton | June 17, 1947 |
| 2,456,453 | Shailor | Dec. 14, 1948 |